United States Patent
Tomoda et al.

(10) Patent No.: US 8,149,193 B2
(45) Date of Patent: Apr. 3, 2012

(54) IMAGE INPUT DETECTION APPARATUS AND STORING MEDIUM

(75) Inventors: Kyotaro Tomoda, Ebina (JP); Tsutomu Ishii, Ebina (JP); Yasunori Saito, Ashigarakami-gun (JP); Shigehiko Sasaki, Ebina (JP); Akira Ichiboshi, Ebina (JP); Masahiro Sato, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 496 days.

(21) Appl. No.: 12/388,539

(22) Filed: Feb. 19, 2009

(65) Prior Publication Data

US 2010/0079390 A1   Apr. 1, 2010

(30) Foreign Application Priority Data

Sep. 26, 2008   (JP) .................................. 2008-247198

(51) Int. Cl.
*G06F 3/041* (2006.01)
(52) U.S. Cl. .......................................... 345/87; 345/107
(58) Field of Classification Search .................. None
See application file for complete search history.

(56) References Cited

U.S. PATENT DOCUMENTS

| 7,248,899 B2 * | 7/2007 | Ozaki et al. .................. 455/566 |
| 2005/0083282 A1 * | 4/2005 | Honbo .............................. 345/87 |
| 2007/0069993 A1 * | 3/2007 | Kato ................................. 345/76 |

FOREIGN PATENT DOCUMENTS

| JP | A-7-230261 | 8/1995 |
| JP | A-2000-66169 | 3/2000 |
| JP | A-2007-299016 | 11/2007 |

* cited by examiner

Primary Examiner — Joseph Haley
(74) Attorney, Agent, or Firm — Oliff & Berridge, PLC

(57) ABSTRACT

An image input detection apparatus comprises: a voltage applier that applies a voltage of a predetermined waveform to a display medium; a first acquisition unit that acquires a vibration waveform generated in the display medium; a first memory that stores a vibration waveform determined based on the waveform of the voltage applied by the voltage applier; and a second memory that stores information representing that an image written on the display medium has been overwritten, when the difference between the waveform acquired by the first acquisition unit and the waveform stored in the first memory lies within a threshold value.

6 Claims, 4 Drawing Sheets

200: DISPLAY MEDIUM

| MEDIUM ID | 01 | |
|---|---|---|
| IMAGE DATA ID | WRITE FLAG | ERASE FLAG |
| 10001 | 1 | 0 |
| 10002 | 1 | 1 |
| 10003 | 0 | 0 |
| ... | ... | ... |

IMAGE INPUT DETECTION APPARATUS AND STORING MEDIUM

CROSS-REFERENCE TO RELATED APPLICATIONS

This application is based on and claims priority under 35 U.S.C. 119 from Japanese Patent Application No. 2008-247198, which was filed on Sep. 26, 2008.

BACKGROUND

1. Technical Field

The present invention relates to an image input detection apparatus and a storing medium.

2. Related Art

A technology, in which an image is written on a display medium of the type used for optical writing by applying a voltage to the display medium while irradiating it with light, has been developed.

SUMMARY

In an aspect of the invention, there is provided an image input detection apparatus comprising: a voltage applier that applies a voltage of a predetermined waveform to a display medium; a first acquisition unit that acquires a vibration waveform generated in the display medium; a first memory that stores a vibration waveform determined based on the waveform of the voltage applied by the voltage applier; and a second memory that stores information representing that an image written on the display medium has been overwritten, when the difference between the waveform acquired by the first acquisition unit and the waveform stored in the first memory lies within a threshold value.

BRIEF DESCRIPTION OF THE DRAWINGS

Exemplary embodiments of the present invention will be described in detail based on the following figures, wherein.

DETAILED DESCRIPTION

Structure

Figure 1:
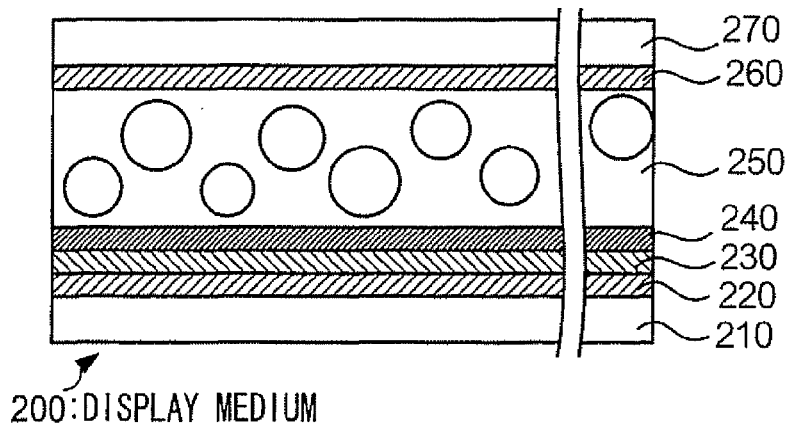
FIG. 1 is an explanatory diagram illustrating the configuration of a display medium according to an exemplary embodiment.

FIG. 1 illustrates the structure of a display medium 200 of the type used for optical writing. In its display region, where images are displayed, the display medium 200 includes film substrates 210 and 270, transparent electrodes 220 and 260, a photoconductor layer 230, a colored layer 240, and a display element layer 250, with images displayed thereon in response to irradiation with light. Moreover, the display medium 200 includes a memory called a wireless tag, e.g. an RFID (Radio Frequency Identification) tag. This wireless tag stores a medium ID, i.e. identifying information assigned to the display medium 200.

The display medium 200 allows for images to be overwritten multiple times. As used herein, the concept of "image overwriting" includes both processing until a process of erasing a previously written image, in other words, writing a background color image across the entire display region, and processing until a process of writing a different, new image after erasing the previously written image. In order to write an image on the display medium 200 and then erase this image, it is sufficient to irradiate it with light from a light source 132 while applying a voltage of predetermined waveform between the transparent electrode 220 and transparent electrode 260 and then stop the application of the voltage.

Film substrates 210, 270 are layers provided to protect the surface of the display medium 200. They are made of PET (polyethylene terephthalate) etc. The film substrate 210 is provided on the side irradiated with light by a writing device writing images on the display medium. The film substrate 270 is provided on the side, from which the user views the written images. The transparent electrodes 220, 260 are layers composed, for example, of ITO (indium tin oxide). When an electrode (not shown) connected to the transparent electrodes 220 and 260 is connected to an electrode on the writing device, a voltage applied to the electrodes by the writing device generates a potential difference between the transparent electrode 220 and transparent electrode 260.

The photoconductor layer 230 is a layer made up of an electrical conductor exhibiting different electrical conductivity depending on the intensity of light irradiation. For instance, an organic photoconductor can be used for the photoconductor layer 230. The colored layer 240, which is a layer visible when the display element layer 250 lets light through, has a predetermined color (e.g. black). The display element layer 250 contains display elements exhibiting different light reflection states depending on the applied voltage. The display element layer 250 is obtained by dispersing microencapsulated cholesteric liquid crystal display elements in a binder resin. The alignment of the cholesteric liquid crystal display elements may be a planar alignment or a focal-conic alignment. In case of a planar alignment, the cholesteric liquid crystal display elements reflect light (via Bragg reflection) to exhibit a predetermined color and, in case of a focal-conic alignment, transmit light to reveal the color of the colored layer 240.

Figure 2:
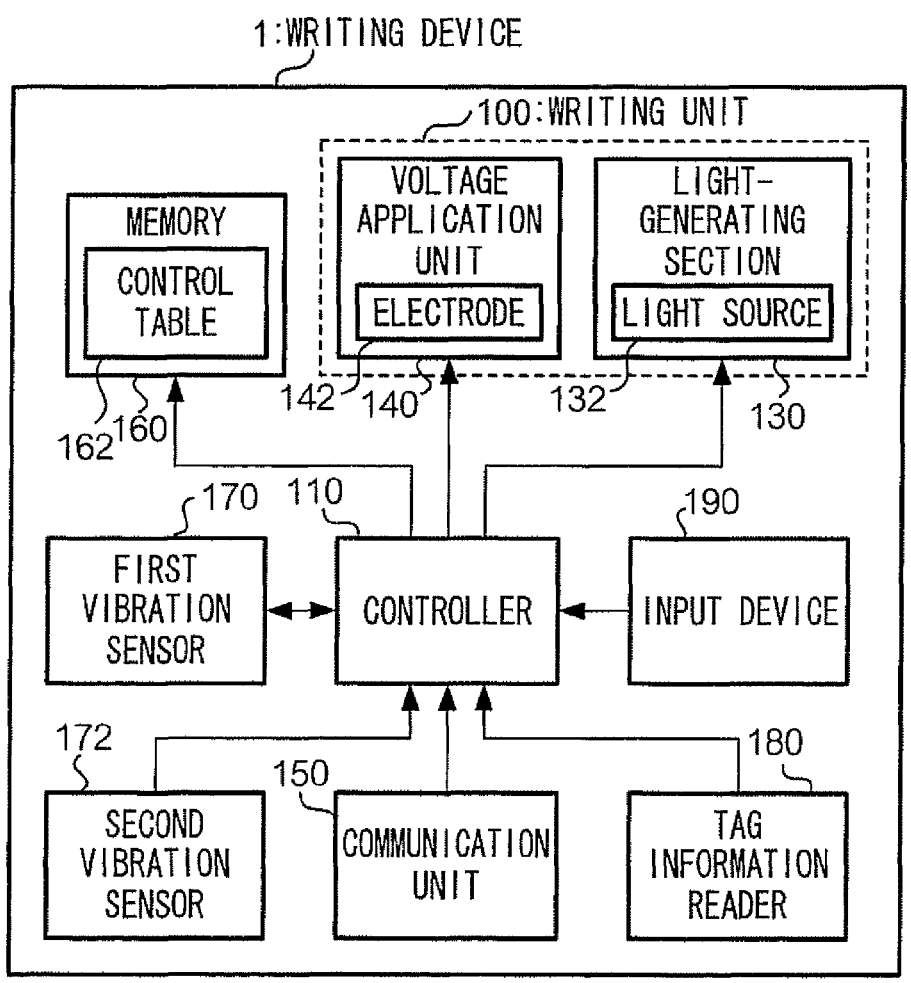
FIG. 2 is a block diagram illustrating the configuration of a writing device according to an exemplary embodiment.

FIG. 2 is a block diagram illustrating the configuration of a writing device 1, which writes images on the display medium 200. The writing device 1 includes a writing unit 100, a controller 110, a communication unit 150, a memory 160, a first vibration sensor 170, a second vibration sensor for external disturbances 172, a tag information reader 180, and an input device 190. The controller 110, which includes a computing device, such as a CPU (Central Processing Unit), and a memory, such as a memory module etc., controls the operation of each component of the writing device 1. This controller 110 and memory 160 operate as an image input detection apparatus that determines whether or not an image written on the display medium 200 has been overwritten. The communication unit 150, which is made up of a communication circuit and a network interface, communicates with communication devices communicatively connected to this communication unit. The memory 160, which is a nonvolatile memory, such as an EEPROM (Electrically Erasable and Programmable Read Only Memory), stores a control table 162 in addition to image information representing various images and computer programs executed by the controller 110. Information used for exercising control over which images have been written on which display medium 200 and whether or not the images have been erased from the display medium 200 is listed in this control table 162. The tag information reader 180, which is a wireless tag reader, reads information stored in the wireless tag of the display medium 200 from the wireless tag and supplies it to the controller 110. The input device 190 accepts a user's operating input and supplies signals corresponding to the operating input to the controller 110.

The writing unit 100 includes a light-generating section 130 and a voltage application unit 140. The light-generating section 130, which has a light source 132, generates light used for irradiation during image writing and image overwriting on the display medium 200. This light source 132 is, for example, an LED array combining multiple LEDs arranged in a linear formation with lenses focusing the light of each LED within a range corresponding to the resolution used to write the images. Along with controlling the turning on and off of each LED of the light source 132, the controller 110 moves the light source 132 so as to scan the display surface of the display medium 200. The voltage application unit 140 includes electrodes 142 and a step-up section such as, for example, a bipolar high voltage amplifier. When the display medium 200 is held in a predetermined location of the writing unit 100, the electrode 142 on the writing unit 100 comes into contact with the electrode on the display medium 200. In such a state, a voltage is applied to the display medium 200 through the electrode 142 by the voltage application unit 140.

Figure 3A:
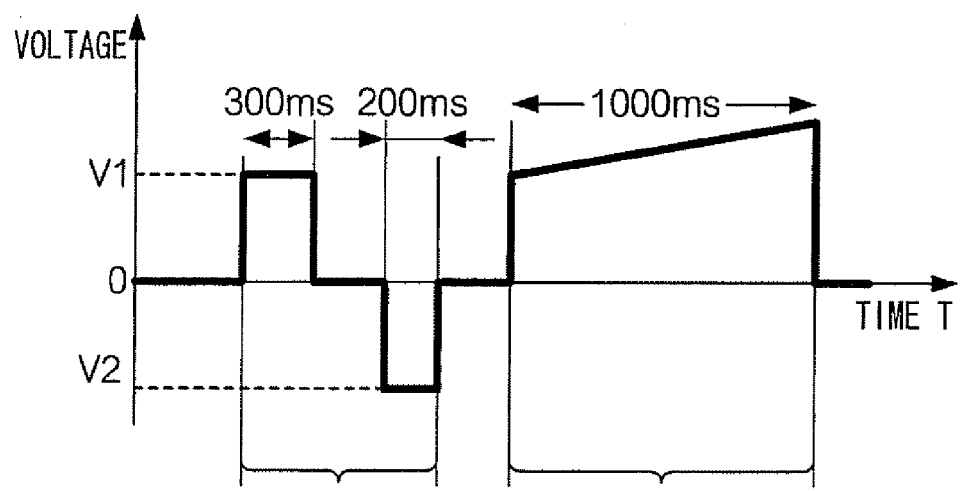
FIG. 3A is a diagram illustrating an exemplary voltage waveform, and (B) is a diagram illustrating an exemplary vibration waveform.

Here, FIG. 3A shows an example of a voltage waveform applied to the display medium 200 by the voltage application unit 140. The waveform W1 shown in the same figure is the waveform of the voltage applied to the display medium 200 when an image previously written on the display medium 200 is erased. The period of application of the positive voltage V1 shown in the figure is, for example, 300 ms, and the period of application of the negative voltage V2 is, for example, 200 ms. As a voltage of such waveform W1 is applied, the entire area of the display medium 200 is irradiated with light of predetermined intensity from the light-generating section 130 and an image of a uniform background color is written across the entire display region, thereby erasing the above-mentioned image.

On the other hand, the waveform W2 is the waveform of the voltage applied to the display medium 200 when a new image corresponding to the image information is written on the display medium 200. The period, during which the positive voltage is applied at such time is, for example, 1000 ms. As the voltage of this waveform W2 is applied, the display medium 200 is irradiated with light corresponding to the image information from the light-generating section 130, thereby writing an image on the medium.

As described above, cholesteric liquid crystal display elements or the like are utilized in the display element layer 250 employed in the display medium 200. When a voltage is applied to the micro-encapsulated cholesteric liquid crystal display elements, the liquid crystal molecules sealed inside the capsules are set in motion and the motion of the liquid crystals at such time causes a phenomenon, in which the display element layer 250 lightly vibrates, with this vibration transmitted to the entire display medium 200. The first vibration sensor 170, which is made up of an acceleration sensor or the like, is provided in a medium holder 120, with the first vibration sensor 170 detecting the vibration of the display medium 200 and supplying the detected vibration waveform to the controller 110. The controller 110 acquires this vibration waveform. In other words, the controller 110 operates as an example of an acquisition unit (first acquisition unit) acquiring the vibration waveform generated in the display medium 200, on which images are displayed in response to irradiation with light.

However, the writing device 1 may sometimes vibrate as a result of factors external to the writing device 1, such as when a person walks past the device or when a person touches it. Therefore, in addition to the vibrations generated in the display medium 200 in response to voltage application, vibrations induced by external disturbances such as the ones mentioned above, are included in the vibrations detected by the first vibration sensor 170 provided in the writing device 1. Accordingly, to be able to reduce the influence of the vibrations induced by external disturbances, a second vibration sensor for external disturbances 172 is provided in a portion of the enclosure 101, to which the vibrations of the display medium 200 are not transmitted. The vibration waveform detected by the second vibration sensor 172 is supplied to the controller 110, with the controller 110 acquiring it. In other words, the controller 110 operates as an example of an acquisition unit (second acquisition unit) acquiring the vibration waveform generated in the writing device 1, which writes images on the display medium 200. The controller 110 then subtracts the vibration waveform acquired from the second vibration sensor 172 from the vibration waveform acquired from the first vibration sensor 170. As a result, the influence of the vibrations induced by external disturbances on the vibrations detected by the first vibration sensor 170 decreases.

Figure 3B:
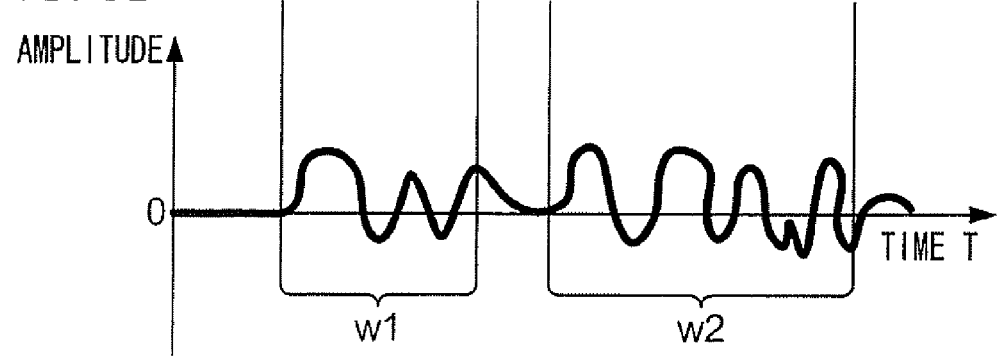

Here, FIG. 3B shows an example of a vibration waveform calculated by the controller 110 when the voltage of waveform illustrated in FIG. 3A is applied. In other words, this is a vibration waveform obtained when the controller 110 subtracts the vibration waveform acquired from the second vibration sensor 172 from the vibration waveform acquired from the first vibration sensor 170. As will be evident from a comparison between FIG. 3A and FIG. 3B, the display element layer 250 vibrates when a voltage is applied to the display element layer 250 and, on the other hand, the display element layer 250 does not vibrate when no voltage is applied to the display element layer 250. There is a certain correspondence between the voltage waveform and vibration waveform. In the example illustrated in the figure, there is a correspondence between the voltage waveform W1 and vibration waveform w1 and, on the other hand, there is a correspondence between the voltage waveform W2 and vibration waveform w2. Calculations or experiments are used in advance to determine what vibration waveforms are generated in response to what voltage waveforms, with the obtained vibration waveforms stored in memory 160. In the present exemplary embodiment, the vibration waveform w1 illustrated in FIG. 3B is stored in memory 160 in advance. This vibration waveform w1 is an example of a vibration waveform determined in dependence on the waveform of the voltage applied to the display medium 200. Thus, the memory 160 operates as an example of a memory (first memory) storing vibration waveforms determined in dependence on the waveforms of the applied voltage.

Figure 4:
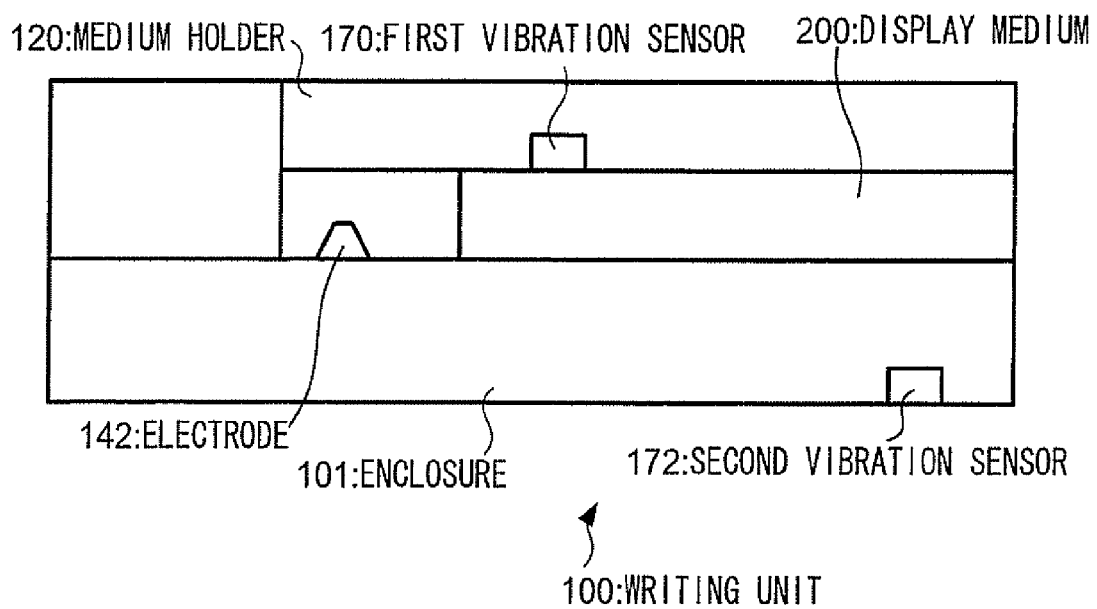
FIG. 4 is an explanatory diagram illustrating the configuration of a writing unit according to an exemplary embodiment.

Here, FIG. 4 is a lateral cross-sectional view of the writing unit 100 obtained when it holds the display medium 200.

The enclosure 101 of the writing unit 100 is made up of a light-shielding member and holds the components of the light-generating section 130 and voltage application unit 140. The medium holder 120 covers the top side of the display medium 200 and holds it such that the display medium 200 is immobilized relative to the writing unit 100. The light-generating section 130 irradiates the bottom side of the display medium 200 with light. The first vibration sensor 170 is provided in a location of the medium holder 120, in which it is in contact with the display medium 200. On the other hand, the second vibration sensor 172 is secured to the enclosure 101 in a location, in which the vibrations of the display medium 200 are not detected, in other words, a location that as far away as possible from the display medium 200.

Operation

The operational diagram 5 is a flow chart illustrating the processing involved in the execution of the program stored in a memory 160 by the controller 110. The operation of the present exemplary embodiment will be now explained with reference to this figure. It should be noted that it is assumed that an image corresponding to image information has already been written on the display medium 200 at the start of the following procedure.

It is assumed that, by input device 190, the user has issued an instruction to overwrite the image that was written on the display medium 200 with another image. When the controller 110 detects an operating input containing an instruction to overwrite the image (Step S1: "YES"), an image overwriting process is performed (Step S2). Specifically, the controller 110 controls the voltage application unit 140 to apply a voltage of waveform W1 of FIG. 3A to the display medium 200 held in the writing unit 100. In other words, the controller 110 operates as an example of an application section applying a voltage of predetermined waveform to the display medium 200. The controller 110 controls the light-generating section 130 to irradiate the entire display medium 200 with light of predetermined intensity. As a result, the phase status of the liquid crystal molecules of the display element layer 250 is made uniform and an image of a uniform background color is written across the entire display region. In other words, the image displayed prior to the operation is overwritten with the background color image. At such time, the controller 110 and writing unit 100 operate as an example of an overwriting section irradiating the display medium 200, on which an image has been written, with light along with applying thereto a voltage of predetermined waveform, thereby overwriting the image. Next, the controller 110 reads the image information of the next image to be written from the memory 160 and, along with applying a voltage of waveform W2 of FIG. 3A to the display medium 200, controls the light-generating section 130 to irradiate the display medium 200 with light corresponding to image information that has been read out. As a result, a new image is displayed on the display medium 200. At such time, the controller 110 and writing unit 100 operate as an example of a writing section irradiating the display medium 200 with light corresponding to image information along with applying a voltage thereto, thereby writing an image on the display medium 200.

Upon execution of the image overwriting process of step S2, the first vibration sensor 170 and vibration sensor for external disturbances 172 try to detect the respective vibrations. In addition, upon execution of image overwriting in step S2, the controller 110 determines whether the first vibration sensor 170 has detected vibrations in the display medium 200 (Step S3). If the first vibration sensor 170 has detected vibrations in the display medium 200 (Step S3: "YES"), the controller 110 subtracts the vibration waveform acquired from the second vibration sensor 172 from the vibration waveform acquired from the first vibration sensor 170. The controller 110 then determines whether the waveform obtained by subtraction matches the waveform stored in memory 160 (Step S4). As used herein, the term "match" does not necessarily mean a "perfect match", and may also include cases wherein the difference between the waveform obtained by subtraction and the waveform stored in memory 160 is within a certain threshold value. Since this threshold value is stored in memory 160 in advance or recorded in the software program, the controller 110 can look it up.

As a result, a match between the two waveforms match (Step S4: "YES") implies that an image has been overwritten. Accordingly, the controller 110 stores information specifying that the image displayed on the display medium 200 prior to the overwriting of the image has been erased (Step S5).

Figures 5, 6:
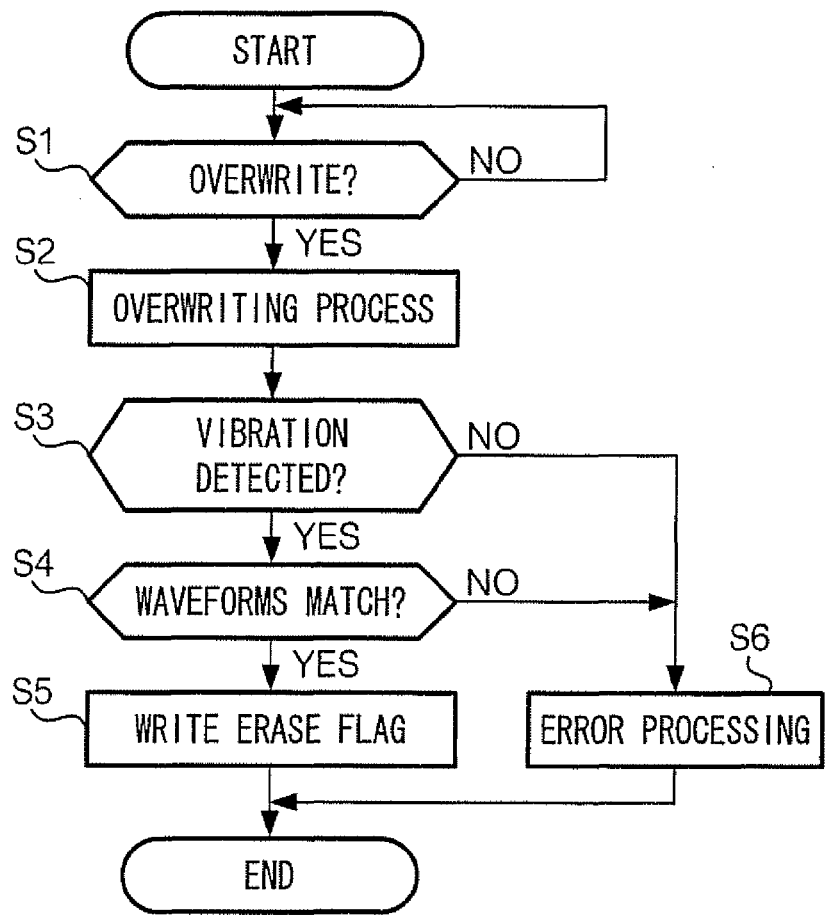
FIG. 5 is a flow chart illustrating an example of processing according to an exemplary embodiment.
FIG. 6 is a flow chart illustrating an exemplary control table according to an exemplary embodiment.

Here, FIG. 6 shows an example of the contents of the control table 162 stored in memory 160.

For each medium ID read by the tag information reader 180 from the wireless tag of the display medium 200, the control table 162 lists unique image IDs respectively assigned to information corresponding to each image, write flags showing whether the images of each image information entry have been written on the display medium and erase flags showing whether these images have been erased. As shown in FIG. 6, the write flag of the image with an image ID of "10001" is "1", which means that it has been written on the display medium 200 and, on the other hand, its erase flag is "0", which means it has not been erased from the display medium 200. In other words, this means that the image with an image ID of "10001" is currently being displayed on the display medium 200. Further, the write flag of the image with an image ID of "10002" is "1", which means that it has been written on the display medium 200 and, on the other hand, its erase flag is "1", which means it has been erased from the display medium 200. In other words, this means that the image with an image IID of "10002" is not being displayed on the display medium 200 at the current moment. Furthermore, the write flag of the image with an image ID of "10003" is "0", which means that it has not been written on the display medium 200 and, on the other hand, its erase flag is "0", which means it has not been erased from the display medium 200. In other words, this means that the image with an image ID of "10003" is not being displayed on the display medium 200 at the current moment. For instance, assuming that the image with an image ID of "10002" has been overwritten with the image having an image ID of "10003" in Step S2 above, the write flag corresponding to the image ID of "10002" will be "1" and the erase flag will be "1". At the same time, the write flag corresponding to the image ID of "10003" will be "1" and the erase flag will be "0".

On the other hand, if in Step S3 no vibration is detected by the first vibration sensor 170 (Step S3: "NO") and, in Step S4, the waveform stored in the memory 160 does not match the waveform obtained by subtracting the vibration waveform detected by the second vibration sensor 172 from the vibration waveform detected by the first vibration sensor 170 (Step S4: "NO"), this means that the image has not been overwritten despite the operating input containing an image overwriting instruction. In such a case, the controller 110 performs error processing either by issuing an alert regarding the fact that the image has not been overwritten with the help of sounds, images, or light or transmitting a notification to that effect to the administrator's communication device from the communication unit 150 (Step S6). For instance, if a user with fraudulent intentions inserts a piece of insulating material such as rubber between the electrode on the display medium 200 and electrode 142 on the writing device 1 and enters an instruction on the writing device 1 telling it to perform an image overwriting operation, the image will not be overwritten because no voltage will be applied to the display medium

200. However, since the vibration of predetermined waveform will not be detected by the first vibration sensor 170 in Step S3 at such time, the controller 110 carry out the above-described error processing and, as a result, will provide a notification of the fact that the image has not been overwritten.

MODIFIED EXAMPLES

The above-described exemplary embodiment may be modified in the following manner. Moreover, the modified examples below may be reduced to practice in combination with each other.

Modified Example 1

While the exemplary embodiment described an example, in which the controller 110 overwrites an image written on the display medium 200 with another image, the invention is not limited to such situations and may use the mechanism of the above-mentioned exemplary embodiment in situations, in which the controller 110 simply erases the image written on the display medium 200, i.e. writes a background color image across the entire display region.

Modified Example 2

According to the exemplary embodiment, whenever the controller 110 determined that the image written on the display medium 200 has been overwritten, it made a record to that effect in the control table 162. The invention is not limited to that and the controller 110 may use sounds, images or light to indicate the fact that the image that was written on the display medium 200 has been overwritten, or output information specifying that the image has been overwritten from the communication unit 150 to a communication device capable of communicating with the writing device 1. In other words, in addition to operating as an example of the second memory storing information specifying that the image written on the display medium 200 has been overwritten, it operates as an example of an output section outputting information specifying that the image written on the display medium 200 has been overwritten.

Modified Example 3

Although in the exemplary embodiment the controller 110 made a determination with respect to the overwriting of the images contained in all the image information, the invention is not limited to that and determination may be made with respect to the overwriting of images contained in specific image information. It is contemplated that there may be cases, wherein images, with respect to which the fact of image overwriting has to be established, are limited to a predetermined range of images, such as highly confidential images, images related to privacy issues, or images one does not want to be seen by random people. Accordingly, indication permission information, which states whether or not the fact that the images on the display medium have been overwritten is indicated, is entered by the controller 110 in the control table 162 in advance in conjunction with the image information of this type of images. The user may use the input device 190 to issue instructions as to what image information is to be associated with what indication permission information, and, in addition, the controller 110 may make a determination in accordance with the creator, creation data, comments and other attributes of the image information. Then, if the images written on the display medium 200 are associated with indication permission information specifying that the fact that the images have been overwritten is indicated, the controller 110 outputs or stores information specifying that the images have been overwritten.

Modified Example 4

While in the exemplary embodiment the controller 110 determined the presence/absence of image overwriting by detecting vibrations corresponding to the voltage waveform produced during image erasure, which is illustrated in FIG. 3A, this may also be done in the following manner.

Figure 7:
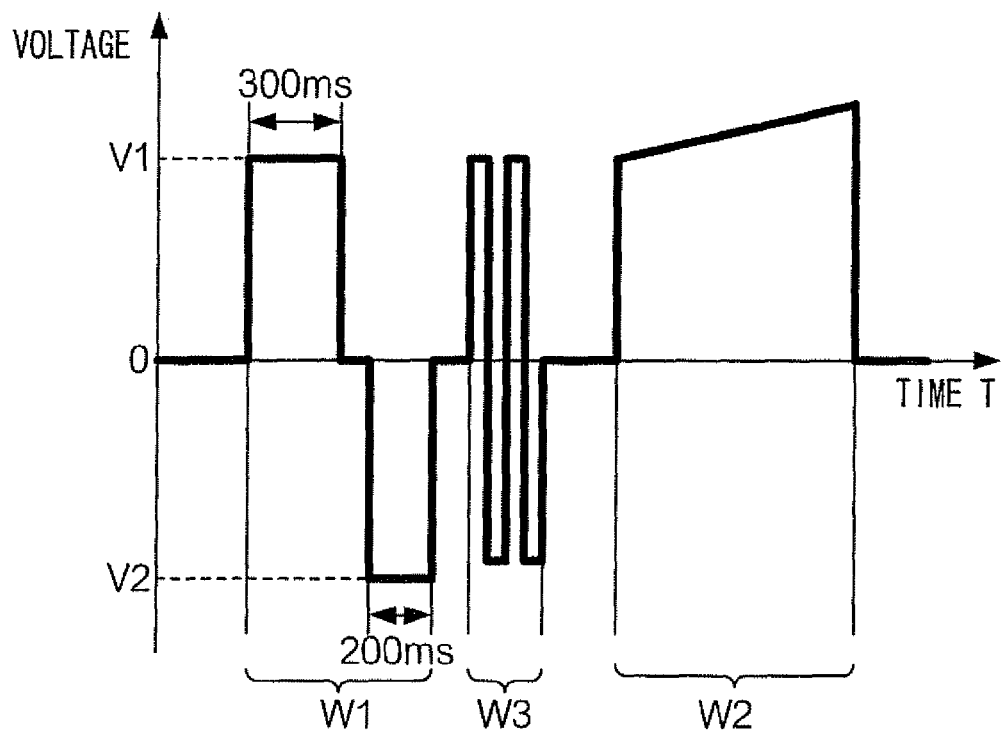
FIG. 7 is a diagram illustrating an exemplary voltage waveform.

A voltage of predetermined waveform, such as the one shown in FIG. 7, is applied by the controller 110 to the display medium instead of the voltage of the waveform illustrated in FIG. 3A. Here, in the waveform shown in FIG. 7, a waveform W3 is located between the waveform W1 and waveform W2 illustrated in FIG. 3A. Since the waveform W3 is a high-frequency AC waveform, when a voltage of such a waveform W3 is applied, the frequency of vibration of the liquid crystals in the display medium 200 increases and the vibration frequency of the display medium 200 increases as well. This helps distinguish vibrations corresponding to the application of voltage of waveform W3 and other vibrations. In such a case, a vibration waveform determined by experiment or calculation in dependence on the waveform W3 is stored in memory 160. In summary, it is sufficient to store a vibration waveform determined in dependence on the waveform of the applied voltage in the memory 160.

While images are not overwritten during the period of application of the voltage of waveform W3, the presence of vibrations corresponding to the waveform W3 can be considered as evidence of the fact that an image has been overwritten because the voltage of waveform W3 is applied immediately after the waveform W1, which is used for erasing images. Therefore, the controller 110 applies the voltage of waveform W3 to the display medium 200 and if the difference between the vibration waveform acquired from the first vibration sensor 170 and vibration waveform stored in the memory 160 is within a certain threshold value, outputs or stores information specifying that the image that was written on the display medium 200 has been overwritten.

Modified Example 5

In addition to the vibrations of the display medium 200, other evidence may be used in combination therewith as evidence in determining whether an image has been overwritten. For instance, a low-intensity sound may sometimes be generated when liquid crystals in the display element layer 250 vibrate as a result of voltage application to the display medium 200. Accordingly, a sound-collecting section is provided in the writing device 1, with the controller 110 comparing sounds collected by the sound-collecting section with sounds stored in the memory 160 and determining that an image has been overwritten if the difference between the two is within a certain threshold value. Moreover, since an electric current flows to the display medium 200 during the application of voltage to the display medium 200, the controller 110 may determine that an image has been overwritten by detecting this electric current using a current detection section.

Modified Example 6

The exemplary embodiment took into consideration the influence of vibrations due to external factors, such as people's movement, etc. However, if the influence of vibrations due to such external factors is absent or can be ignored, it is possible to use a configuration that does not include the second vibration sensor 172.

The locations of the first vibration sensor 170 and vibration sensor for external disturbances 172 are not limited to the ones illustrated in FIG. 4. For instance, the first vibration sensor 170 may be located in the vicinity of the electrode 142.

Modified Example 7

Figure 8:
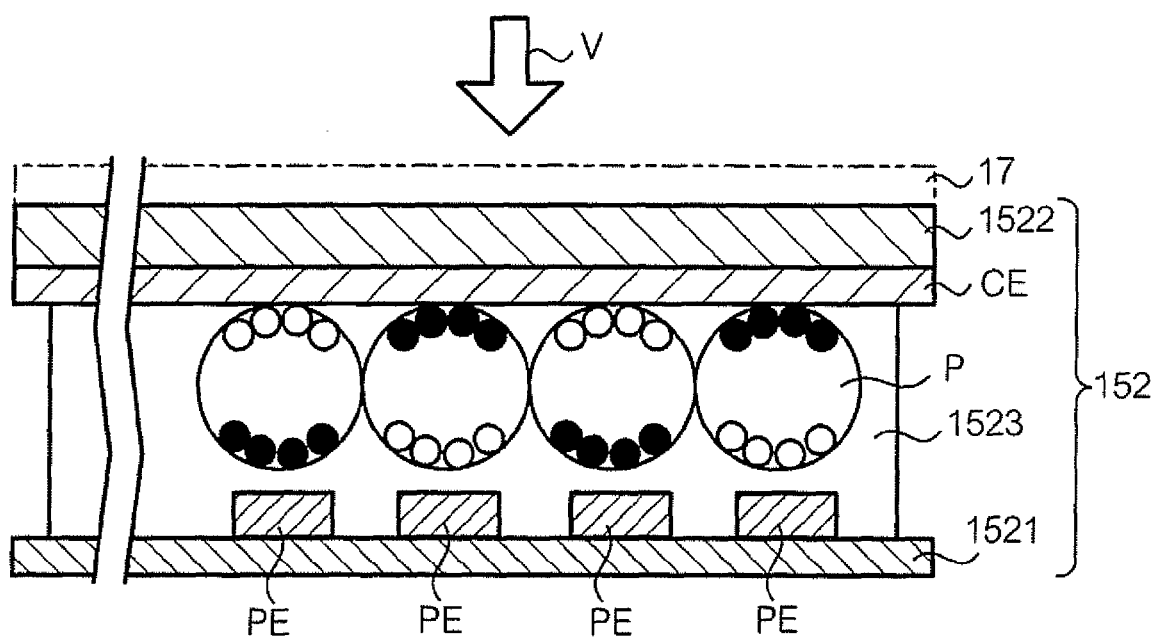
FIG. 8 is an explanatory diagram illustrating the configuration of a display medium according to a modified example.

While the exemplary embodiment made use of a display medium of the type used for optical writing, which included a cholesteric liquid crystal element, the type of the display medium is not limited thereto, and it may any kind of medium as long as it produces vibrations upon voltage application. For instance, it may be an electrophoretic display medium, such as the one illustrated in FIG. 8. In FIG. 8, a display medium 152 is made up of a first substrate 1521, a second substrate 1522, electrophoretic elements P, and binder 1523. In FIG. 8, the upward direction is towards the front side of the display surface, while the downward direction is towards the rear side. The display medium 152 is viewed by the user from the front side, e.g. in the direction of the arrow V. The first substrate 1521 is, for example, a glass substrate, with multiple pixel electrodes PE arranged in a regular grid on its top face. The pixel electrodes PE are active-matrix type elements, e.g. TFTs utilizing a low-temperature polysilicon film. Moreover, the second substrate 1522, which faces the first substrate 1521, is a substrate made of a transparent resin, such as, for example, polyethylene terephthalate, with a transparent common electrode CE made of, for example, indium tin oxide (ITO: Indium Tin Oxide) etc. provided underneath it. Multiple electrophoretic elements P are secured between the multiple pixel electrodes PE and the common electrode CE with the help of a light-transmitting binder 1523. The electrophoretic elements P, which are substantially spherical, have a size of several dozen micron or so. A liquid dispersing medium containing positively (+) charged black pigment particles and negatively (−) charged white pigment particles is sealed inside the electrophoretic elements P. The position of the black pigment particles and white pigment particles is determined by an externally applied electric field and is kept stable by the dispersing medium.

Modified Example 8

The software program executed by the controller 110 is a software program that causes a computer to operate as an application section that applies a voltage of predetermined waveform to a display medium; a first acquisition unit that acquires a vibration waveform generated in the display medium; a first memory that stores a waveform determined in dependence on the waveform of the voltage applied by the application section; and a second memory that stores information specifying that an image written on the display medium has been overwritten if the difference between the waveform acquired by the first acquisition unit and waveform stored in the first memory is within a certain threshold value. This program can be provided in recorded form on recording media such as magnetic tapes, magnetic disks, floppy disks, optical recording media, magneto-optical recording media, CDs (Compact Disks), DVDs (Digital Versatile Disks), RAM, etc. Moreover, components other than the CPU of the controller 110, e.g. a dedicated processor, etc., may be used to carry out the process illustrated in FIG. 5.

The foregoing description of the embodiments of the present invention is provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image input detection apparatus comprising:
   a voltage applier that applies a voltage of a predetermined waveform to a display medium;
   a first acquisition unit that acquires a vibration waveform generated in the display medium;
   a first memory that stores a vibration waveform determined based on the waveform of the voltage applied by the voltage applier; and
   a second memory that stores information representing that an image written on the display medium has been overwritten, when the difference between the waveform acquired by the first acquisition unit and the waveform stored in the first memory lies within a threshold value.

2. The image input detection apparatus according to claim 1, further comprising a second acquisition unit that acquires a vibration waveform generated in a writing device which writes an image on the display medium, wherein
   the second memory further stores information representing that an image written on the display medium has been overwritten, when the difference between a waveform obtained by subtracting the waveform acquired by the second acquisition unit from the waveform acquired by the first acquisition unit and the waveform stored in the first memory lies within a threshold value.

3. The image input detection apparatus according to claim 1 or 2, wherein:
   the second memory further stores an identifier that identifies the image and an indicator indicating whether the image identified by the identifier has been overwritten on the display medium, and
   the second memory further stores information that an image written in the display medium has been overwritten, when the image is overwritten in a case where the indicator for the image indicates that the image has been overwritten.

4. The image input detection apparatus according to claim 1 or 2, further comprising an output unit that outputs the information that an image written on the display medium has been overwritten, when the image is overwritten.

5. The image input detection apparatus according to claim 3, further comprising an output unit that outputs the information that an image written on the display medium has been overwritten, when the image is overwritten.

6. A non-transitory storing medium that stores a computer program to cause a computer to execute:
   applying a voltage of a predetermined waveform to a display medium and
   acquiring a vibration waveform generated in the display medium;
   storing a waveform determined based on the waveform of an applied voltage in a memory; and
   storing information that an image written on the display medium has been overwritten, when the difference between the acquired waveform and the waveform stored in the memory lies within a threshold value.

* * * * *